June 26, 1928.
T. RUSSELL
1,675,316
FLEXIBLE SUCTION PIPE FOR USE IN FURNACES AND FURNACE CASINGS
Filed Aug. 24, 1925
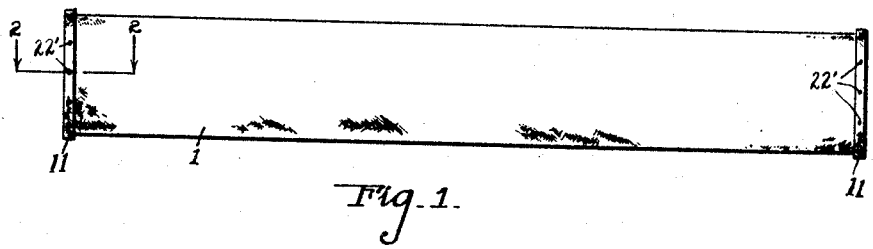
Fig. 1.
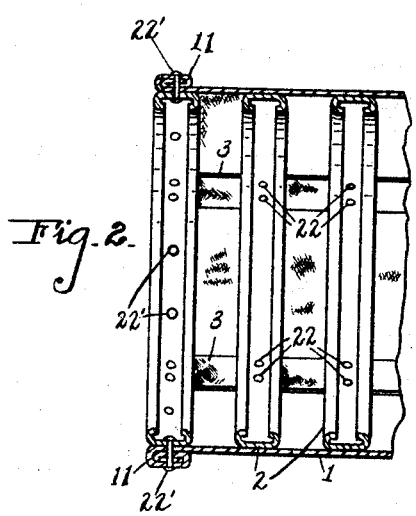
Fig. 2.
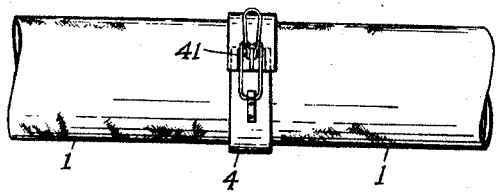
Fig. 3.
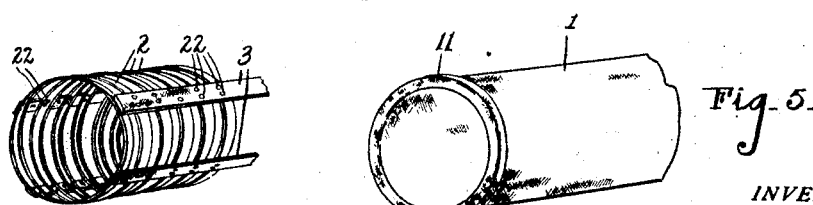
Fig. 4.
Fig. 5.
INVENTOR
Titus Russell
BY
ATTORNEY Patented June 26, 1928.

1,675,316

UNITED STATES PATENT OFFICE.

TITUS RUSSELL, OF HOLLAND, MICHIGAN, ASSIGNOR TO HOLLAND FURNACE COMPANY, OF HOLLAND, MICHIGAN.

FLEXIBLE SUCTION PIPE FOR USE IN FURNACES AND FURNACE CASINGS.

Application filed August 24, 1925. Serial No. 52,175.

This invention relates to an improved flexible suction pipe of large diameter for use in cleaning furnaces and furnace casings.

The object of the invention is to provide a very large pipe twelve inches or more in diameter which is light and very flexible and one which will not collapse under a considerable degree of vacuum.

Objects pertaining to the details of construction will clearly appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Fig. 1 is a side elevation view of a length of pipe.

Fig. 2 is an enlarged detail longitudinal section on line 2—2 of Fig. 1 through one end of the pipe showing details of construction.

Fig. 3 shows the ends of two meeting sections of pipe coupled together.

Fig. 4 is a detail perspective view of the skeleton before the outer fabric covering has been put into place.

Fig. 5 is a detail perspective view of one end of the fabric covering before it is applied to the skeleton.

In the drawing similar reference characters refer to similar parts throughout the several views.

My improved pipe consists of a tubular outer casing 1 cylindrical in form supported by a series of supporting rings 2. These rings of sheet metal have inturned beads at their edges to increase the rigidity of the rings, thereby making them very light and presenting rounded surfaces to the casing. These rings are held together by longitudinal straps 3 preferably of webbing which are secured to the rings by a pair of rivets 22 at each point of connection. The skeleton appears in detail in Fig. 4.

The outer tubular casing 1 is placed over the skeleton and the end is rolled up on itself at 11, see the detail in Fig. 2, and the same secured to the end ring by long rivets 22', thus making a strengthening and packing ring at the end which lends itself very readily to coupling by the coupling 4 which is held in place by an adjusting clamp 41, which parts are detailed in a companion patent application.

My structure is especially designed for large suction pipes for suction cleaners particularly adapted to my method of cleaning furnaces and I desire to claim the same specifically in the form in which I have it illustrated.

Having thus described my invention, what I claim as new and desire to secure by Letters Patent is:

1. A pipe comprising an outer fabric casing, an inner supporting skeleton composed of sheet metal supporting rings turned inwardly at each edge thereof, and supporting straps disposed outside said rings to which the said rings are secured, the end of the casing being rolled outwardly upon itself and secured by rivets to the end ring, all coacting as specified.

2. A pipe comprising an outer fabric casing, an inner supporting skeleton composed of sheet metal supporting rings turned inwardly at each edge thereof, and supporting straps disposed outside said rings to which the said rings are secured, the end of the casing being secured by rivets to the end ring, all coacting as specified.

In witness whereof I have hereunto set my hand.

TITUS RUSSELL.